Figure 6:
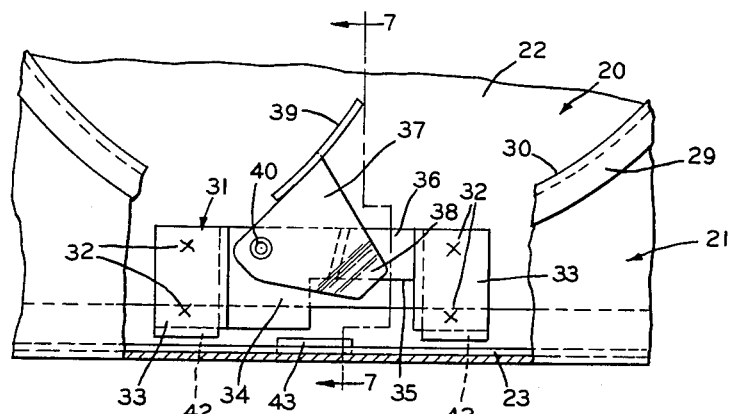

April 17, 1956 P. C. JANSON 2,742,173
SOCKET METER BOX LATCH
Filed Aug. 21, 1953 2 Sheets-Sheet 1
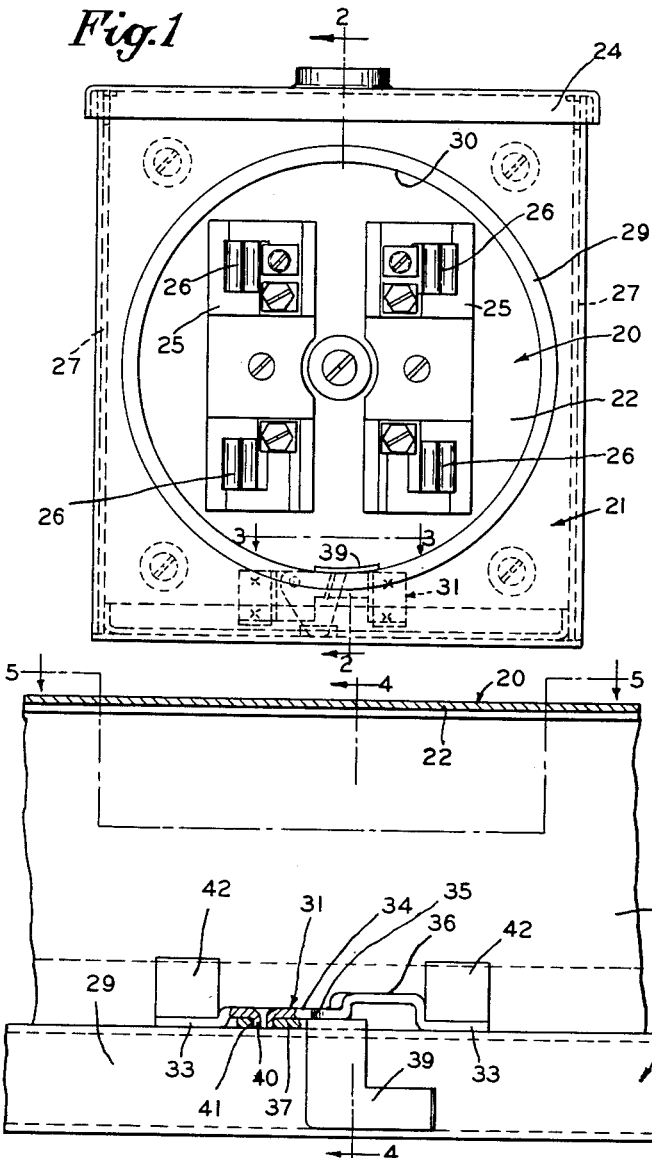
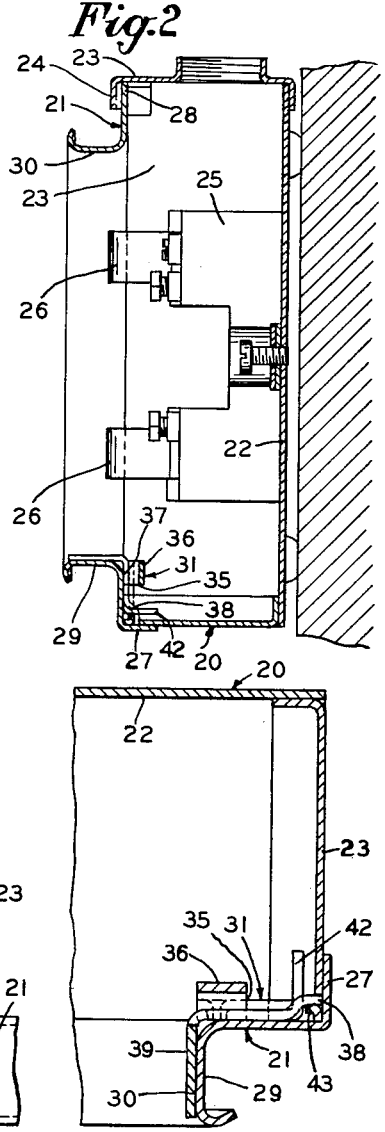
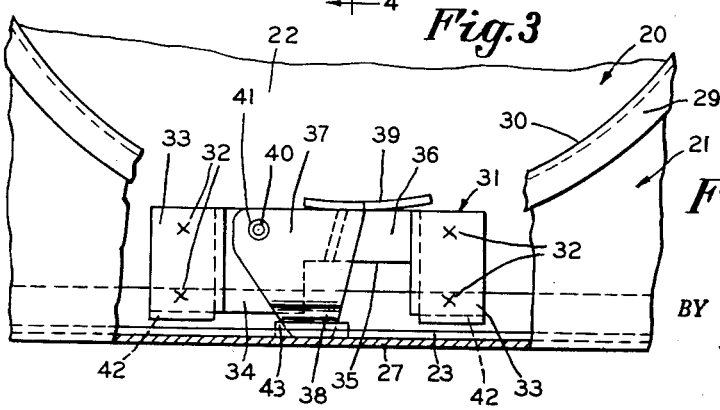
INVENTOR.
Paul C. Janson
BY
Frease & Bishop
ATTORNEYS April 17, 1956 P. C. JANSON 2,742,173
SOCKET METER BOX LATCH
Filed Aug. 21, 1953 2 Sheets-Sheet 2

INVENTOR.
Paul C. Janson
BY
Frease & Bishop
ATTORNEYS

United States Patent Office 2,742,173
Patented Apr. 17, 1956

2,742,173
SOCKET METER BOX LATCH

Paul C. Janson, near Navarre, Ohio, assignor to The Superior Switchboard and Devices Company, Canton, Ohio, an Ohio corporation Application August 21, 1953, Serial No. 375,728

8 Claims. (Cl. 220—3.8)

The invention relates to socket meter boxes for receiving detachable electrical instruments such as watt hour meters, and more particularly to a novel latch for securing a removable cover upon such a box.

Such boxes are provided with removable covers, the cover having a ring opening or socket therein to receive the rearwardly projecting contact blades of the meter, which engage contact jaws within the box. When the meter is mounted in position on the box, the meter itself closes the opening in the cover.

Boxes of this type such as are now in general use are ordinarily provided with a diametrically disposed bridge bar upon the cover located across the circular opening therein and adapted to be connected to the insulation blocks in the box which carry the contact jaws, by bolts or screws to secure the cover upon the box. In order to remove the cover from the box it is necessary to first remove these bolts or screws which connect the bridge bar to the insulation blocks.

It is an object of the invention to provide a box of the type referred to in which such a bridge bar across the opening in the cover is eliminated and the opening is entirely unobstructed.

Another object is to provide such a box in which the cover is provided with a simple latch means for detachably connecting it to the box.

A further object is to provide a latch member pivotally mounted upon the underside of the cover for interlocking engagement with an adjacent portion of the box.

A still further object is to provide a support bracket on the underside of the cover the latching member being pivotally mounted thereon between the cover and the support bracket.

Another object is to provide angular flanges upon the support bracket spaced slightly from the adjacent side wall of the box.

A further object of the invention is to provide such a pivoted latching member which is accessible only through the ring opening in the cover.

A still further object is to provide an angular flange upon the latching member located within said opening.

Figure 7:
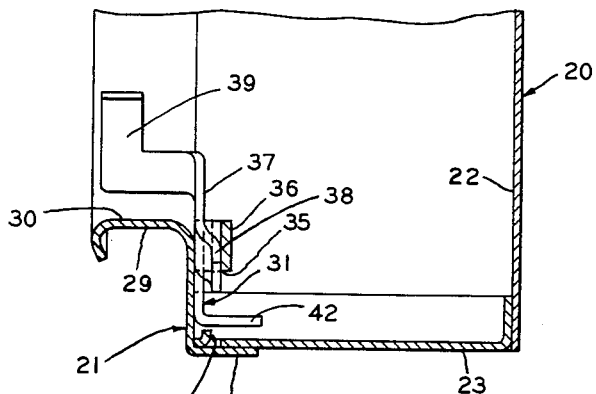
Figure 8:
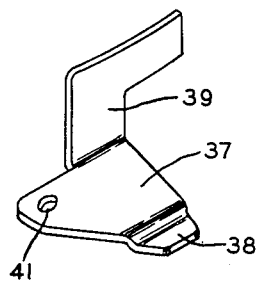

The above objects together with others which will be apparent from the drawings and following description, or which may be later referred to, may be attained by constructing the socket meter box and cover with the improved latching means therefor in the manner hereinafter described in detail and illustrated in the accompanying drawings, in which;

Fig. 1 is a front elevation of a socket meter box with cover or closure mounted thereon and provided with the improved latching device to which the invention pertains;

Fig. 2 a longitudinal, sectional view through the box, taken as on the line 2—2, Fig. 1;

Fig. 3 an enlarged, fragmentary view of portions of the box and cover with the latching device in locked position, taken as on the line 3—3, Fig. 1;

Fig. 4 a fragmentary, sectional view, taken as on the line 4—4, Fig. 3;

Fig. 5 a fragmentary, sectional view, taken as on the line 5—5, Fig. 3;

Fig. 6 a view similar to Fig. 5 showing the latch in unlocked position;

Fig. 7 a section on the line 7—7, Fig. 6; and,

Fig. 8 a detached, perspective view of the latching member.

Referring now more particularly to the embodiment of the invention illustrated, a box is indicated generally at 20 and provided with a detachable cover or closure indicated generally at 21. The box is preferably formed of sheet metal of suitable gauge and comprises generally the bottom or back wall 22 and side walls 23. One side wall has an overhanging flange 24, spaced above and overhanging the end portions of the adjacent side walls.

Insulation blocks 25 are mounted upon the back wall 22 and support the conventional contact jaws 26 which receive the usual contact blades on the rear of the meter or other electrical instrument as in usual and well known practice.

The cover 21 is provided at its lower edge and along the two adjacent edges with inturned angular flanges 27 adapted to overlie the adjacent edge portions of the corresponding side walls of the box, the upper edge 28 thereof being adapted to be inserted beneath the overhanging flange 24 upon the adjacent side wall of the box.

The usual ring flange 29 is provided upon the cover, defining a circular opening 30 adapted to receive a detachable electrical instrument, such as a watt hour meter or the like, in usual and well known manner so that the contact blades upon the rear of the meter may be received in the contact jaws 26 in the box, as is customary in such devices.

As will be seen from the drawings the circular opening 30 is entirely unobstructed, the conventional bridge bar usually provided therein for attaching the cover to the box, being eliminated.

For the purpose of detachably connecting the cover to the box, without requiring the conventional bridge bar and the bolts or screws ordinarily used for connecting the same to the insulation blocks, a novel latching means is provided which forms the subject matter of the present invention.

This latching means is mounted on the underside of the cover 21 and is accessible for operation only through the opening 30 in the cover when the meter is removed from the box. For the purpose of mounting the latching means upon the cover, a support bracket, indicated generally at 31, is attached to the underside of the cover, at a point opposite to the edge portion 28 of the cover, as by welding or the like as indicated at 32.

This support bracket is substantially rectangular in shape, the end portions 33 thereof being attached to the underside of the cover while the intermediate portion 34 is offset downwardly therefrom and has the cut out portions 35 which is further offset downwardly as at 36.

The latch member 37, which is of generally triangular shape, is pivotally connected to the support bracket. The outer end of the latch member 37 is offset downwardly as at 38. At the other end of the latch member is formed the angular, L-shape flange 39 which is slightly arcuate to conform to the curvature of the circular opening 30.

This latch member is pivotally mounted upon the offset portion 34 of the support bracket, between the bracket and the underside of the cover. For the purpose of providing a simple and inexpensive means for pivotally attaching the latch member to the support bracket, a stud 40 is extruded upwardly from the support bracket and received in the aperture 41 in the adjacent corner portion of the latch member to provide a pivot therefor.

Down turned flanges 42 are formed upon the end portions 33 of the support bracket and located parallel to, and spaced from, the adjacent flange 27 of the cover and may act as guides in positioning the cover upon the box.

A locking flange 43 is bent inwardly from the adjacent side wall 23 of the box and, as best shown in Figs. 4 and 5, the offset end portion 38 of the latch member 37 is adapted to be received beneath said flange to hold the cover in locked position upon the box. In this position of the latch member the arcuate flange 39 thereof is located against the inner surface of the ring flange 29 of the cover.

In order to unlock the latch member, it is necessary that the meter first be removed from the box so that access may be had to the flange 39 of the locking member through the opening 30. When the latch member is swung to the position shown in Figs. 6 and 7, withdrawing the offset end portion 38 thereof from engagement with the locking flange 43 of the box, this offset end portion of the latch member is received in the cut out offset portion 35—36 of the support bracket as best shown in Fig. 7.

This end of the cover may then be raised to disengage the same from the adjacent side wall of the box and the cover may then be slidably moved to disengage the opposite edge portion 28 thereof from beneath the flange 24 of the box permitting the cover to be removed from the box.

From the above it will be obvious that a simple and efficient latching device is provided whereby the cover may be secured to the box without requiring the use of the conventional bridge bar and bolts or screws, and in which the latching device is accessible only through the ring opening in the cover when the meter is removed from the box.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, a flange on said opposite side wall and disposed toward the first-named side wall and underlying the opposite end portion of the cover, and a latch member pivotally mounted on the underside of said opposite end portion of the cover and pivotally movable in a plane parallel with the cover for engagement with said last-named flange, said latch member forming the sole means for detachably connecting the cover to the box and being accessible only through said opening in the cover.

2. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, and a latch member pivotally mounted on the underside of the opposite end portion of the cover and pivotally movable in a plane parallel with the cover for locking engagement with said opposite side wall, said latch member forming the sole means for detachably connecting the cover to the box and being accessible only through said opening in the cover.

3. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, a flange on said opposite side wall and disposed toward the first-named side wall and underlying the opposite end portion of the cover, and a latch member pivotally mounted on the underside of said opposite end portion of the cover and pivotally movable in a plane parallel with the cover for engagement with said last-named flange, said latch member forming the sole means for detachably connecting the cover to the box, and an outwardly disposed angular flange upon said latch member for manually operating the latch member, said angular flange being located within said opening in the cover and being accessible only through said opening in the cover.

4. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, and a latch member pivotally mounted on the underside of the opposite end portion of the cover and pivotally movable in a plane parallel with the cover for locking engagement with said opposite side wall, said latch member forming the sole means for detachably connecting the cover to the box, and an outwardly disposed angular flange upon said latch member for manually operating the latch member, said angular flange being located within said opening in the cover and being accessible only through said opening in the cover.

5. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, a flange on said opposite side wall and disposed toward the first-named side wall and underlying the opposite end portion of the cover, a support bracket mounted on the underside of said opposite end portion of the cover, and a latch member pivotally mounted on said bracket and pivotally movable in a plane parallel with the cover for engagement with said last-named flange, said latch member forming the sole means for detachably connecting the cover to the box and being accessible only through said opening in the cover.

6. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, a flange on said opposite side wall and disposed toward the first-named side wall and underlying the opposite end portion of the cover, a support bracket mounted on the underside of said opposite end portion of the cover, and a latch member pivotally mounted on said bracket and pivotally movable in a plane parallel with the cover for engagement with said last-named flange, said latch member forming the sole means for detachably connecting the cover to the box, and an outwardly disposed angular flange upon said latch member for manually operating the latch member, said angular flange being located within said opening in the cover and being accessible only through said opening in the cover.

7. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, a support bracket mounted on the underside of said opposite end portion of the cover, and a latch member pivotally mounted on said bracket and pivotally movable in a plane parallel with the cover for locking engagement with said opposite side wall, said latch member forming the sole means for detachably connecting the cover to the box and being accessible only through said opening in the cover.

8. A socket meter box for detachably receiving a detachable electrical instrument, said box comprising a back wall and substantially perpendicular side walls at the marginal edges of the back wall forming an open front box, and a detachable cover for the open front side of the box, said cover having an entirely unobstructed opening therein designed to be closed by such a detachable electric instrument, a flange at the outer edge of one side wall of the box, said flange being disposed toward the opposite side wall and being substantially parallel with the bottom wall and overhanging the adjacent end portion of the cover, a support bracket mounted on the underside of said opposite end portion of the cover, and a latch member pivotally mounted on said bracket and pivotally movable in a plane parallel with the cover for locking engagement with said opposite side wall, said latch member forming the sole means for detachably connecting the cover to the box, and an outwardly disposed angular flange upon said latch member for manually operating the latch member, said angular flange being located within said opening in the cover and being accessible only through said opening in the cover.

References Cited in the file of this patent
UNITED STATES PATENTS

| Number | Name | Date |
|---|---|---|
| 902,900 | Norton | Nov. 3, 1908 |
| 1,265,767 | Fouts | May 14, 1918 |
| 1,964,871 | Cook | July 3, 1934 |
| 2,359,628 | Daly | Oct. 3, 1944 |
| 2,620,377 | Lajeunesse et al. | Dec. 2, 1952 |